May 6, 1952 — N. M. LAWLESS — 2,595,959
INDUSTRIAL TRUCK
Original Filed June 1, 1948 — 6 Sheets-Sheet 1

INVENTOR.
NATHAN M. LAWLESS
BY Geo. B. Pitts
ATTORNEY

May 6, 1952   N. M. LAWLESS   2,595,959
INDUSTRIAL TRUCK
Original Filed June 1, 1948   6 Sheets-Sheet 2

INVENTOR.
NATHAN M. LAWLESS
BY Geo. B. Pitts
ATTORNEY.

May 6, 1952     N. M. LAWLESS     2,595,959
INDUSTRIAL TRUCK Original Filed June 1, 1948     6 Sheets-Sheet 3

INVENTOR.
NATHAN M. LAWLESS
BY
Geo. B. Pitts
ATTORNEY.

May 6, 1952 N. M. LAWLESS 2,595,959
INDUSTRIAL TRUCK
Original Filed June 1, 1948 6 Sheets-Sheet 4

INVENTOR.
NATHAN M. LAWLESS
BY Geo. B. Pitts
ATTORNEY.

INVENTOR.
NATHAN M. LAWLESS
BY Geo. B. Pitts
ATTORNEY.

Patented May 6, 1952

2,595,959

UNITED STATES PATENT OFFICE 2,595,959

INDUSTRIAL TRUCK

Nathan M. Lawless, Muskegon Heights, Mich., assignor to The Baker-Raulang Company, Cleveland, Ohio, a corporation of Ohio Continuation of application Serial No. 30,329, June 1, 1948. This application August 17, 1950, Serial No. 180,014

19 Claims. (Cl. 187—9)

This invention relates to an industrial truck, more particularly an industrial truck having an elevating member for stacking bodies (boxes, cartons, crates, filled bags and the like), and carrying out loading and unloading operations in plants, warehouses, docks and storage areas. To provide in a truck of this type an elevating member which may be raised varying heights and thus be adapted to a wide range of operating conditions, the elevating member is slidably mounted on a plurality of inner and outer telescopically related guides, which, when in normal position (that is, in side-by-side relation with the elevating member in its down position), permit the truck to be driven through doorways, openings and other areas having low overhead conditions, but are relatively movable endwise, that is, the inner guides are extensible relative to the outer guides to enable the elevating member to travel to and from elevations or levels above the height of the outer guides. However, in all trucks having guides operable in this manner, of which I have knowledge, the operating means for the elevating member and the guides therefor are inter-related, so that when power is applied to raise the elevating member from its down position to an elevated position or level or in the reverse direction, the inner guides simultaneously move in the same direction, although at a slower speed as compared to that of the elevating member. It will thus be observed that the operation of raising the elevating member to any desired level is effective to move the inner guides above or beyond the upper end of the outer guides, so that stacking, loading and unloading operations in freight cars, boats, trailers, warehouses having low ceilings, low overhead members or roofs and other areas where the overhead approximates the height of the outer guides for the elevating member, cannot be carried out.

One object of the invention is to provide, in a truck, having an elevating member movably supported by outer guides and inner extensible guides, improved power means for raising the elevating member, automatically operable to initially control the movement of the elevating member relative to and independently of the inner guides to and from levels within the upper ends thereof when outer and inner guides are in side-by-side relation and thereafter effect movement of the extensible guides above the upper ends of the outer guides, whereby the elevating member may be raised to higher levels.

Another object of the invention is to provide, in an elevating truck, improved power means for raising the elevating member, operable to move the latter a predetermined distance from its down position upwardly relative to and independently of its guides, whereby stacking, loading and unloading operations at or within levels which approximate the heighth of the inner guides may be carried out.

Another object of the invention is to provide, in an elevating truck having outer guides and inner extensible guides for the elevating member, improved power means for raising the elevating member capable of initially moving it to a predetermined level relative to and independently of its inner guides and automatically operable to move the extensible guides and guide the elevating member to higher levels.

Another object of the invention is to provide an improved fluid operated mechanism for the elevating member of an industrial truck operable to effect movement of the elevating member to and from a predetermined level and thereafter to effect relative movement of the guides for the elevating member and movement of the latter to higher levels.

Another object of the invention is to provide an improved fluid operated mechanism for raising and lowering the elevating member on an industrial truck, the mechanism consisting of inter-related fluid actuated members having connections with a source of fluid supply under pressure and operable (a) to initially raise the elevating member to and from a predetermined level and intermediate levels independently of its guides or (b) effect relative movement of the guides and elevating member, whereby the latter may be raised to a higher level.

Other objects of the invention will be apparent to those skilled in the art to which my invention relates from the following description taken in connection with the accompanying drawings, wherein.

In the drawings, 1 indicates as an entirety a chassis mounted on front and rear wheels 2, 3, respectively. The wheels at either the front or rear of the chassis 1 may be driven and also steerably mounted. The mounting of the driving mechanism for the driven wheels and the power supply for the driving mechanism may be suitably supported on the chassis dependent upon the capacity of the truck and other factors. As these mechanisms and the mountings therefor form no part of the present invention and may be of any desired construction, illustrations of these mechanisms are omitted. In the exemplified form of construction, a casing 4 on the rear end of the chassis 1 houses the power supply and a casing 5 on the front end of the chassis 1 houses certain of the operating equipment for the truck, the space between the casings 4, 5, being utilized as the driver's station. 6 indicates as an entirety a fluid operated elevating mechanism for an elevating member or load carrier 7 adapted to engage loads at different levels, transport them to a place of storage, shipment, assembly or other use and discharge them at the same or a different level. The elevating mechanism 6 is preferably mounted to swing inwardly to facilitate transportation of loads on the carrier 7. In the form of construction shown, the outer guides 6a of the elevating mechanism are provided with rearwardly extending arms 8 formed at their outer ends with openings 8a which rotatably fit a hollow axle 2a for the front wheels 2 (see Fig. 4). Where the wheels 2 are driven the hollow axle 2a forms a housing for the shafts which are drivingly connected with the wheels 2. The elevating mechanism 6 is preferably swung from its normal or vertical position inwardly and outwardly by fluid operated means consisting of a cylinder 9 suitably supported in the casing 5 and having a reciprocatable piston connected by a rod 9a to toggles 9b which in turn are pivotally connected to fixed brackets 9c mounted in the casing 5 and a yoke 10, the opposite end portions of the yoke being fixed (preferably welded) to the inner side walls of the guides 6a (see Fig. 6). The supply of fluid to the piston is controlled by a suitable three-way valve of well known construction, operated by a lever 9x.

Figure 1:
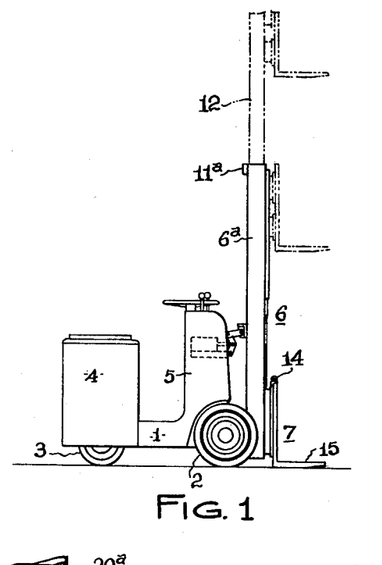
Fig. 1 is a side elevation of a truck embodying my invention.
Figure 2:
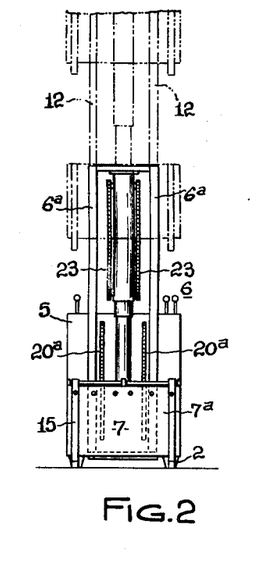
Fig. 2 is a front elevation.
Figures 3, 3A, 3B, 3C, 4:
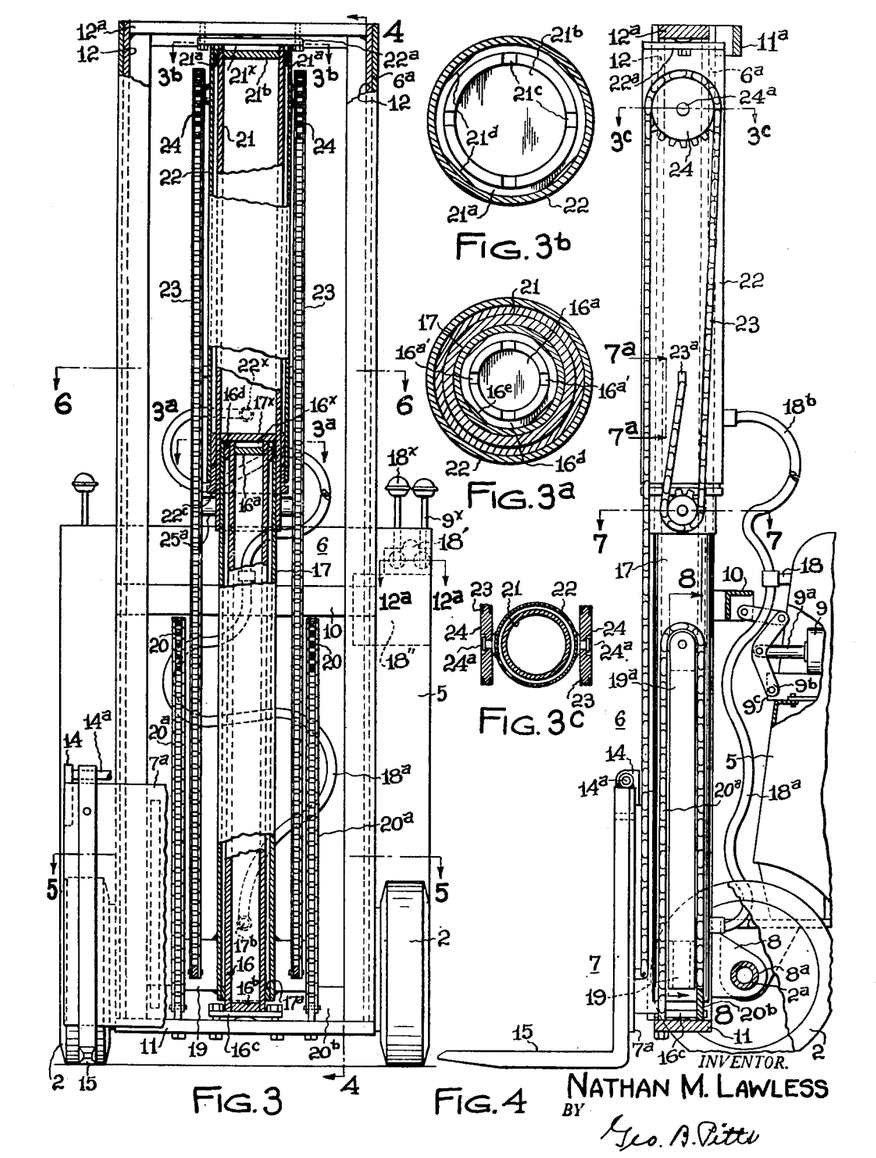
Fig. 3 is a view similar to Fig. 2 (enlarged), parts being broken away.
Figs. 3a and 3b are sections on the lines 3a—3a and 3b—3b, respectively, of Fig. 3.
Fig. 3c is a section on the line 3c—3c of Fig. 4.
Fig. 4 is a section on the line 4—4 of Fig. 3.
Figures 11, 12:
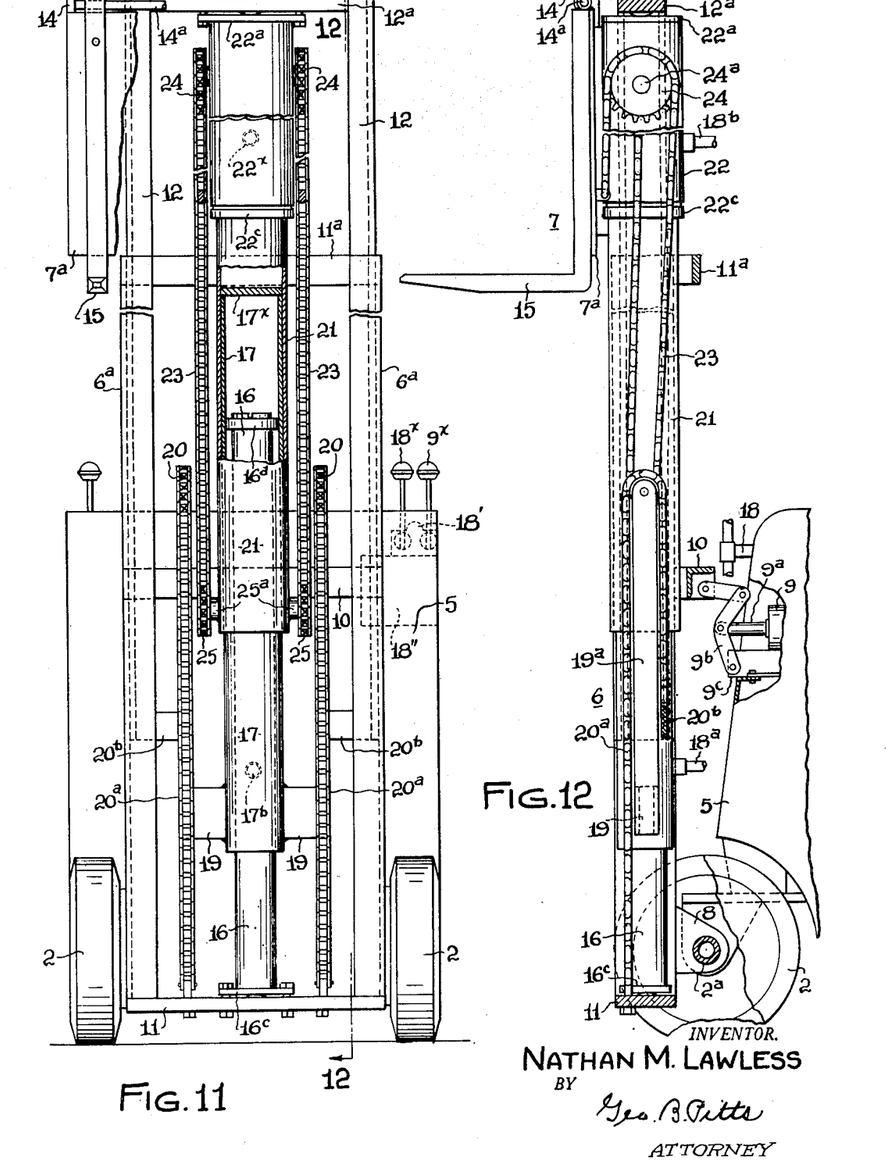
Fig. 11 is a view substantially similar to Fig. 9, but showing the position of the parts when the elevating member is raised to a higher level.
Fig. 12 is a section on the line 12—12 of Fig. 11.

The elevating mechanism 6 comprises the following: 6a indicates a pair of outer guides (already referred to) of channel shape in cross section fixedly connected at their lower ends to a base 11, and connected at their upper ends by a cross member 11a. 12 indicates a pair of inner guides of channel shape in cross section slidably fitting the guides 6a and connected together at their upper ends by a cross member 12a. The guides 6a, 12, are of substantially equal length, so that when the load carrier 7 is in its down or lowest position (Figs. 1, 2, 3 and 4), the upper ends of the inner guides 12 do not extend beyond the upper ends of the outer guides 6a. The opposite side walls of the inner guides 12 are engaged by upper and lower rollers 13 to movably support the carrier 7 thereon. The carrier 7 may be of any desired construction, but is shown as consisting of a wall 7a provided with rearwardly extending plates 7b each supporting upper and lower stud shafts 7c on which the rollers 13 are mounted. The upper end of the wall 7a adjacent its opposite sides and intermediate the latter is provided with brackets 14 in which a rod 14a is mounted. The rod 14a extends through openings formed in or hollow bosses provided on the upper ends of the vertical legs of the forks 15 to support the latter on the wall 7a and provide for adjustment of each fork 15 transversely thereof. 16 indicates a piston, which is preferably hollow and having upper and lower heads 16a, 16b, respectively. The lower head 16b is rigidly secured to a plate 16c, which in turn is bolted or otherwise secured to the base 11. The upper end of the piston 16 is provided externally with an annulus 16d, the outer wall of which is cut away as shown at 16e (Fig. 3a) for a purpose later set forth. 17 indicates a cylinder telescopically related to the piston 16 and provided internally at its lower or open end with a ring 17a slidably fitting the piston 16, the ring 17a and annulus 16d providing a fluid chamber between the piston 16 and cylinder 17. The cylinder 17 is preferably substantially equal in length to the piston 16 and when in normal position, (that is, when the carrier 7 is in its down position, as shown in Figs. 3 and 4) the head 17x of the cylinder 17 engages the upper end of the piston 16. The upper end of the cylinder 16 extends above the head 16a to form a space 16x between the latter and the head 17x, the extended end of the cylinder 16 being formed with slots 16a' (see Fig. 3a) to permit flow of liquid from the chamber into the space 16x, when the cylinder 17 is in normal position, as shown in Fig. 3. The side wall of the cylinder 17 is formed with an opening 17b for the supply of fluid (preferably liquid such as oil) under pressure thereinto and discharge of the liquid from the cylinder dependent upon the operation of a suitable valve, which is operated by a lever 18x, connected with the opening 17b by piping 18 having a flexible section 18a to compensate for the movement of the carrier 7 (Fig. 4). The cylinder 17, adjacent its lower end, is provided with diametrically related laterally extending supports 19 on which the lower ends of upright members 19a are supported. The upper end of each upright member 19a is bifurcated to accommodate a sprocket 20, which is engaged by a chain 20a. One end of each chain 20a is suitably anchored to the base 11, whereas its opposite end is secured to a bracket 20b fixed to and extending inwardly from the adjacent inner guide 12. Accordingly, when fluid is supplied to the cylinder 17, as later set forth, to move it endwise upwardly, the guides 12 will be moved upwardly varying desirable distances, one position of the guides being shown in Fig. 11.

21, 22, indicate inner and outer telescopically related cylinders, the inner cylinder 21 slidably fitting the cylinder 17, each cylinder 21 and 17 being movable relative to the other or simultaneously relatively moved as later set forth. The upper end of the outer cylinder 22 is provided with a plate 22a which is bolted or otherwise secured to the cross bar 12a. The inner wall of the cylinder 22 adjacent its lower or open end is provided with an annular band 22b supported in the cylinder by a collar 22c and slidably engaging the cylinder 21, whereas the outer wall of the inner cylinder 21 is provided with an annulus 21a which co-operates with the band 22b to provide an annular chamber between the cylinders 21, 22. The inner cylinder 21 inwardly of its upper end is provided with a head 21b which provides a space 21x between the head 21b and the plate 22a, within the cylinder 21 when the latter is in normal position, as shown in Fig. 3. The end wall of the cylinder 21, outwardly of the head 21b, is formed with slots 21c and the outer side of the annulus 21a is cut away as shown at 21d (Fig. 3b), to permit flow of liquid from the chamber between the cylinders 21, 22, into the space 21x. The side wall of the cylinder 22, inwardly of the band 22b is formed with an opening 22x for the supply of the fluid under pressure thereinto and discharge of the fluid from the cylinder, dependent upon the operation of the lever 18x for the valve, the opening 22x being connected by a section of hose 18b leading from the piping 18 (Fig. 4). 23 indicates a pair of chains connected at their inner ends to the lower portion of the wall 7a of the carrier 7. The chains 23 extend upwardly at diametrically opposite sides of the piston 16 and cylinders 17 and 22 and engage sprockets 24 rotatably supported on stud shafts 24a fixed to the opposite sides of the cylinder 22. From the sprockets 24 the chains 23 extend downwardly and engage sprockets 25 rotatably mounted on stud shafts 25a fixed to the opposite sides of the cylinder 21 below the open end of the cylinder 22. From the sprockets 25, the chains 23 extend upwardly, their outer ends being suitably anchored at 23a to diametrically opposite sides of the cylinder 22.

Figure 9:
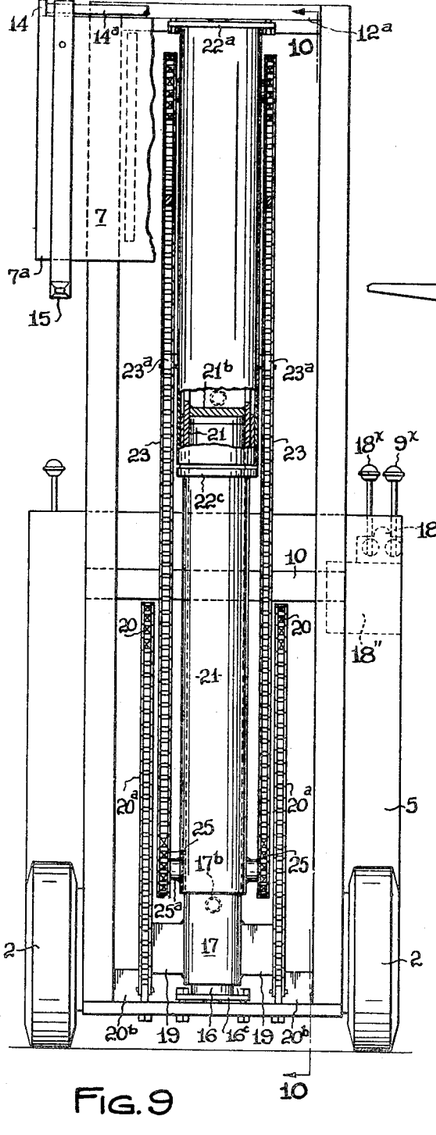
Fig. 9 is a front view, substantially similar to Fig. 3, showing the position of the parts when the elevating member is moved to one level, parts being broken away.
Figure 10:
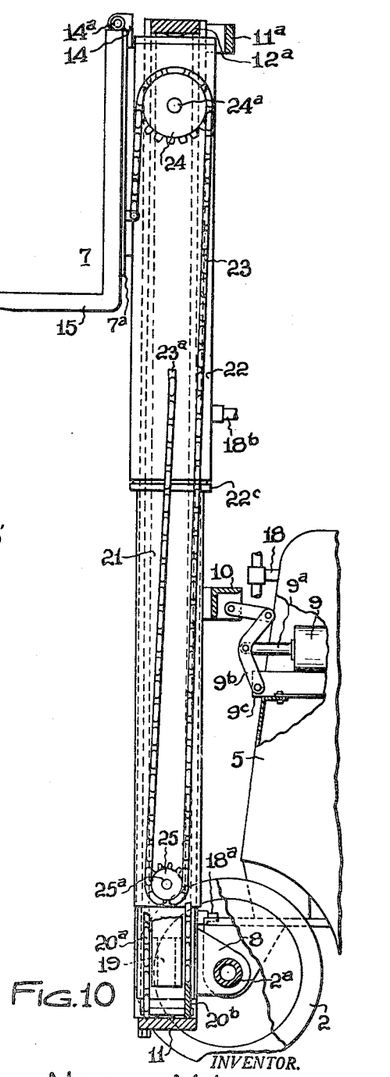
Fig. 10 is a section on the line 10—10 of Fig. 9, parts being broken away.

Operation: The relatively movable cylinders 17, 21, 22, are shown (Figs. 3 and 4) in normal position with the guides 6a, 12, in side-by-side relation and the carrier 7 in its down position. The chambers between the piston 16 and cylinder 17 and between the cylinders 21, 22, are filled with the pressure medium. The fluid under pressure is supplied to and through the pipe 18 and hose sections 18a, 18b, from a single source of supply, namely, a suitable motor driven pump drawing the liquid from a reservoir 18″ upon opening of the control valve by operation of the lever 18x. Accordingly, liquid pressure is supplied to the chamber between the piston 16 and cylinder 17 and to the chamber between the cylinders 21, 22, but by reason of the fact that the area of the head 21b for the cylinder 21 is greater than that of the head 17x for the cylinder 17, the supplied pressure will be effective initially to move the cylinder 21 downwardly relative to the cylinders 17 and 22, thereby carrying with it the sprockets 25. As the pressure is applied between the head 21B and plate 22a, the weight of the carrier 7 and any load thereon is sustained by the cylinder 22, and the outer ends of the chains are anchored at 23a to the cylinder 22, the movement of the sprockets 25 with the cylinder 21 downwardly will transmit a pull on the chains 23, which will reeve about the sprockets 25 and 24, and raise the load carrier 7 to a predetermined level or any selected intermediate level but independently of the extensible or inner guides 12, without raising the latter (see Figs. 9 and 10). If the lever 18x is moved to its other position, the load carrier will gravitate to its down position, cylinder 21 will move upwardly due to pull in the opposite direction on the chains 23: liquid supplied to the chamber between the piston 16 and cylinder 17 will be retained therein, but the liquid in cylinder 22 will be forced out or discharged therefrom through pipes 18b, 18, and the control valve to the reservoir. The downward movement of the cylinder 21 is limited by the engagement of its head or end wall 21b with the upper end of the cylinder 17 (see Fig. 9), the head 17x of which is in engagement with the upper end of the piston 16. In the arrangement disclosed, (a) the length of the piston 16 has a predetermined relation to the length of the guides 6a, 12, so as to limit the endwise movement of the cylinder 21 to one-half the length of the guides 6a, 12, and (b) the load carrier 7 is actuated at a speed twice that of the cylinder 21 and therefore may be moved twice the distance moved by the cylinder 21, in each operation of the control valve to raise or lower the load carrier. Accordingly, upon supply of liquid to operate the cylinder 21 from its normal position (Figs. 3 and 4) to the full limit of its downward movement, the load carrier 7 will be raised to the position shown in Figs. 9 and 10. It will therefore be observed that loading and/or unloading operations may be carried out where overhead conditions are such as to prevent the inner guides 12 to extend above the upper ends of the outer guides 6a.

However, where these overhead limiting condition do not prevail and the supply of liquid under pressure is continued following the engagement of the cylinder 21 with the cylinder 17, as above set forth, the continued supply of liquid into the chamber between the piston 16 and cylinder 17 will exert pressure on and move the latter upwardly. As the head 21b of the cylinder 21 is in engagement with the head of the cylinder 17, and the cylinder 22 between the plate 22a and head 21b is filled with oil, upward movement of the cylinder 17 will move the cylinder 21 upwardly to its upper or normal position. As the uprights 19a are connected to the cylinder 17 and sprockets 20 are carried by the uprights, upward movement of the cylinder 17 will effect a pull on the chains 20a to raise the guides 12 upwardly beyond the guides 6a and thus guide the carrier to a higher level and the guides 12 being connected with the cylinder 22 the latter will move upwardly therewith. As the chains 20a are connected at their inner ends to the base 11 and reeved around the sprockets 20, the guides 12 and cylinder 22 will move upwardly at a speed twice that of the cylinders 17 and 21. Due to this difference in speed movement between the cylinders 21 and 22, the sprockets 24 will move relative to the sprockets 25 to effect a reeving of the chains 23 around the sprockets and move the carrier 7 on the guides 12 to a higher level. If the lever 18x is moved to its opposite position, whereby liquid pressure is relieved, the carrier 7, guides 12 and cylinders 22, 21 and 17 will gravitate downwardly to the position shown in Figs. 9 and 10, such movement effecting a reeving of the chains 23—23 and 20a—20a in the opposite direction, whereas the carrier 7 will continue to gravitate to the position shown in Figs. 3 and 4, the reeving of chains 23—23 during this gravitational movement of the carrier 7 serving to move the cylinder 21 upwardly to its normal or uppermost position. By operation of the lever 18x, the carrier 7 in moving in either direction may be stopped at any desired level within the limits of its travel and held at such level and thereafter moved in either direction.

From the foregoing description it will be seen that while the length of the guides 6a, 12, is determined by the overhead conditions existing where the truck is to be used, the truck may be operated for carrying, raising and lowering loads at loading and unloading stations at the place of use where the overhead space permits the extensible or inner guides 12 to be endwise raised above the outer guides 6a.

From the foregoing description it will be observed that I provide between the lower ends of the outer guides and the upper ends of the extensible or inner guides upper and lower fluid operated piston-cylinder couples in co-operative relation and having a differential operating relation and that the couples are simultaneously supplied with liquid under pressure from a single source of supply. Due to the differential relation between the couples, (a) the upper couple is initially operable to effect the upward and lowering movements of the load carrier to or within a predetermined elevation or level and (b) both couples are successively operable, whereby the load carrier may be raised to and from levels above the predetermined level, these respective operations being carried out by the operation of the valve 18' shown in Fig. 12a. The construction is greatly simplified and readily and rapidly operated due to the fact that only one source of liquid supply and one valve are required to operate the load carrier within the predetermined level or to higher levels by the operator and that while the truck may be used under restricted overhead conditions, it is equally adapted to a wide range of conditions, without removal, replacement or adjustment of any parts of the elevating mechanism or truck construction.

Figures 5, 6, 12A:
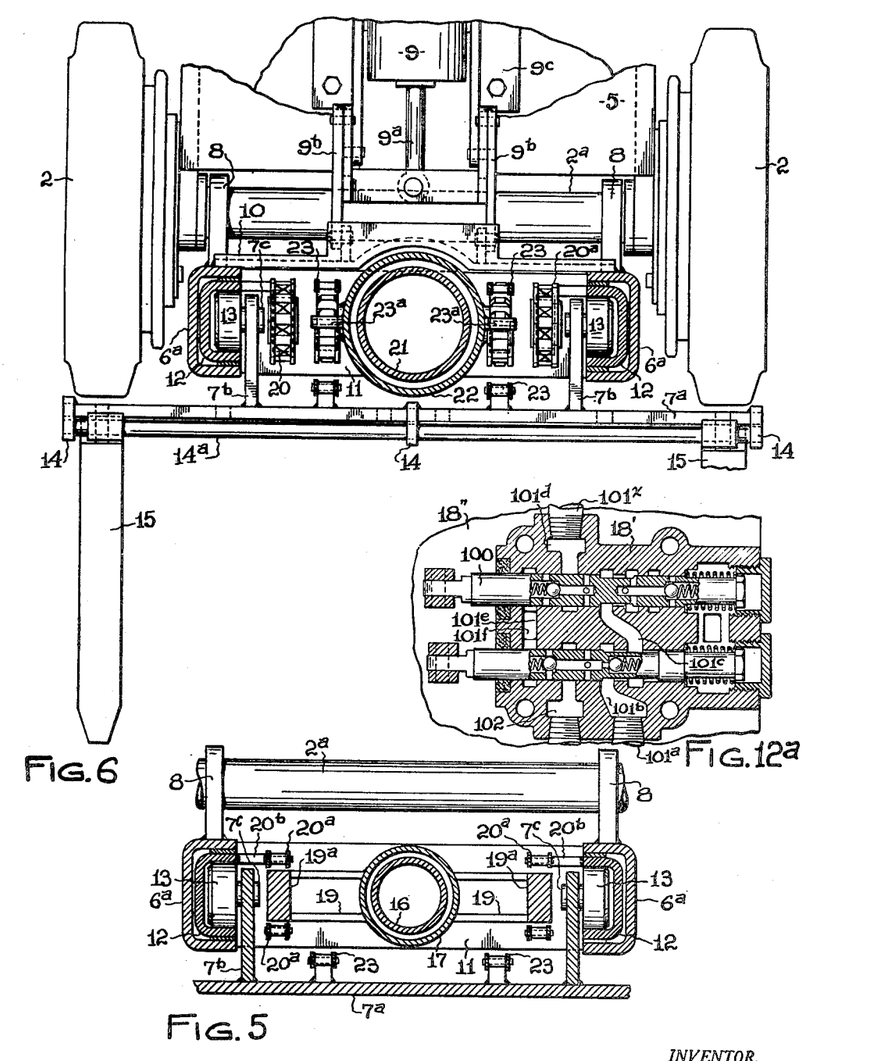
Figs. 5 and 6 are sections on the lines 5—5 and 6—6, respectively, of Fig. 3.
Fig. 12a is a section on the line 12a—12a of Fig. 3.
Figure 7:
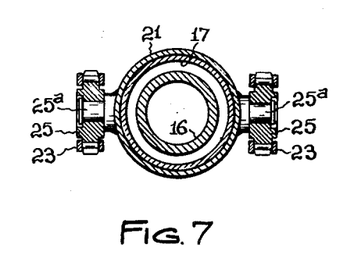
Fig. 7 is a section on the line 7—7 of Fig. 4.
Figure 7A:
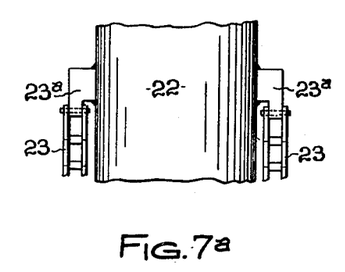
Figs. 7a and 8 are fragmentary elevations on the lines 7a—7a and 8—8, respectively, of Fig. 4.
Figure 8:
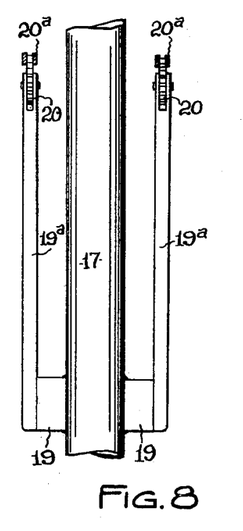
Figure 8A:
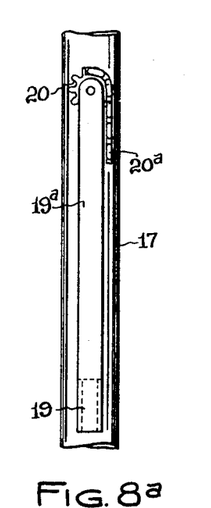
Fig. 8a is a side elevation of parts shown in Fig. 8.

The valve or valves for controlling the supply of liquid to the cylinders 9, 17 and 22 may be of any desired form of construction, one example of which is shown in Fig. 12a, wherein the casing of the valve 18' is mounted on the reservoir 18" (see Fig. 3), the valve element 100 is suitably connected to the lever 9x and the valve element 101 is suitably connected to the lever 18x. In supplying liquid to the cylinder 9 to tilt the elevating mechanism 6, the lever 9x is operated to move the valve element 100 outwardly; liquid under pressure is supplied by pipe 101a, which leads from the pump, to ducts 101b, 101c, 101d, to a pipe 101x, which has connections with the cylinder 9; by operating the lever 9x to its other position, the elevating mechanism 6 gravitates to its normal position and the liquid in the cylinder 9 flows back through pipe 101x, ducts 101d, 101e, to opening 101f leading into the reservoir 18". In supplying liquid to the cylinders 17 and 22, the lever 18x is operated to move the valve element 101 inwardly; liquid under pressure is supplied by the pipe 101a to the duct 101b, flows through valve element 101 to the duct 102 which is connected to pipe 18; operation of the lever 18x to its other position, connects the duct 102 with the duct 100e, so that in the movement of the cylinders 17, 21, or cylinders 17, 21 and 22 to their normal positions, the liquid not retained therein flows back into the reservoir 18".

Figure 13:
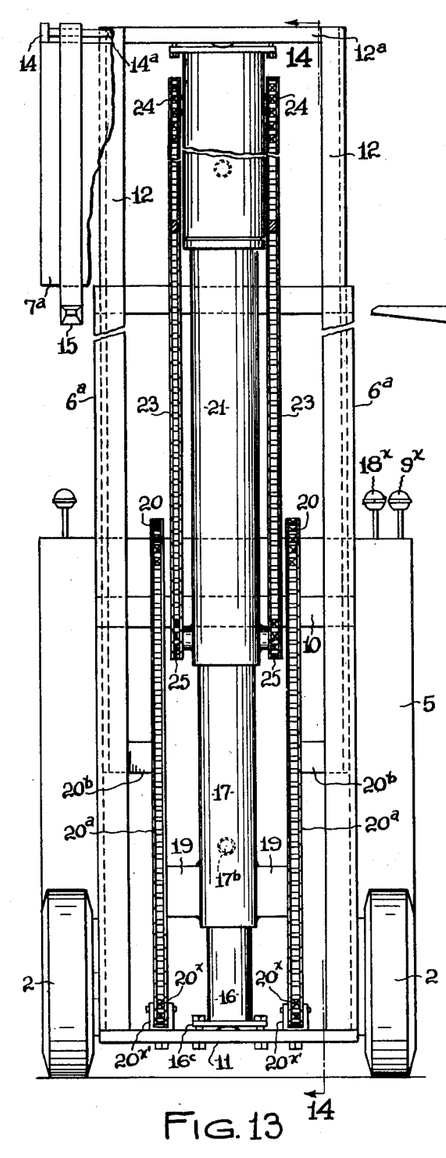
Fig. 13 is a view substantially similar to Figs. 3, 9 and 11, but showing a modified form of construction.
Figure 14:
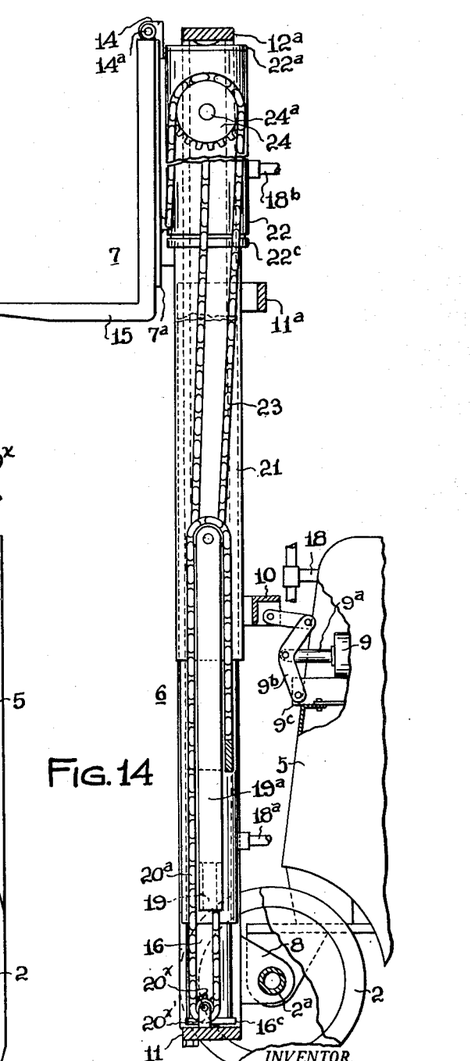
Fig. 14 is a section on the line 14—14 of Fig. 13, parts being broken away.

Figs. 13 and 14 illustrate a modified form of construction wherein the rate of movement of the load carrier, when being raised to and from positions above the predetermined level, is increased relative to the rate of movement of the cylinders 17, 21, whereby loading and unloading operations at these higher levels are facilitated. In this form of construction, the upper and lower fluid operated couples and the reeving connections between the carrier 7 and cylinders 21 and 22 are similar to and operate in the same manner as like parts shown in Figs. 3 to 12, inclusive; also, the cylinder 17 is provided at diametrical sides with supports 19 for the uprights 19a, but the inner ends of the chains 20a are fixed to and extend downwardly from the supports 19 and reeve around sprockets 20x suitably rotatably mounted on standards 20x' fixed to the base 11. From the sprockets 20x, the chains 20a extend upward and reeve around the sprockets 20, their outer ends being connected to the brackets 20b, as set forth in connection with the construction shown in Figs. 1 to 12, inclusive. By connecting the chains 20a to the supports 19 on the cylinder 17 and extending them around the sprockets 20x, it will be seen that when the fluid pressure is effective to move the cylinders 17 and 21 upwardly, the load carrier moves three times as fast as these cylinders and hence speeds up the operations of loading and unloading at the higher levels which require a longer travel of the carrier.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

This application is a continuation of my application filed June 1, 1948, Ser. No. 30,329, now abandoned.

What I claim is:

1. In a truck, the combination with a frame, of a pair of vertical outer guides mounted on said frame, a pair of inner guides telescopically related to said outer guides, a piston fixedly related at its lower end to the lower ends of said outer guides, a plurality of telescopically related, relatively movable cylinders, the lower cylinder being reciprocatable on said piston and the upper outer cylinder being connected to said inner guides, a source of fluid supply under pressure connected to said upper outer cylinder and said lower cylinder, a load carrier slidable on said inner guides, a flexible member connected at its inner end to said carrier and anchored at its outer end to said upper outer cylinder, a reeving element for said flexible member mounted on said upper outer cylinder, a separate reeving element on the lower end portion of one of the cylinders within the said upper outer cylinder, that cylinder carrying said separate reeving element being initially moved downwardly upon the supply of fluid pressure to said upper outer cylinder to raise said carrier relative to said inner guides, means actuated by said lower cylinder for moving said inner guides endwise relative to said outer guides, and a valve for controlling the supply of fluid under pressure into said upper outer cylinder and into said lower cylinder.

2. In a truck, the combination with a frame, of a pair of vertical outer guides mounted on said frame, a pair of inner guides telescopically related to said outer guides, a piston fixedly related to the lower ends of said outer guides, a cylinder reciprocatable relative to said piston, upper telescopically related inner and outer cylinders, the inner cylinder slidably fitting said reciprocatable cylinder and the outer cylinder being connected to the upper end of one of said inner guides, a load carrier slidable on said inner guides, a flexible member connected at its inner end to said carrier and anchored at its outer end to said upper outer cylinder, reeving elements for said flexible member respectively mounted on said upper outer cylinder and on the lower end portion of said inner cylinder, means actuated by said lower cylinder for moving said inner guides endwise relative to said outer guides, and means for supplying fluid under pressure into said upper outer cylinder and into said reciprocatable cylinder.

3. In a truck, the combination with a frame, of a pair of vertical outer guides mounted on said frame, a pair of inner guides telescopically related to said outer guides, a load carrier slidably mounted on said inner guides, telescopically related upper and lower piston-cylinder couples, the piston element of said lower couple being connected at its lower end to the lower end of one of said outer guides, the cylinder element of said upper couple being connected at its upper end to the upper ends of said inner guides and the piston element of said upper couple being hollow and slidably fitting the cylinder element of said lower couple, operating connections between said carrier and the cylinder and piston elements of said upper couple, operating connections between the cylinder element of said lower couple and said inner guides, and means for simultaneously supplying fluid under pressure to said couples, said couples having a differential relation effective to initially move said carrier relative to and independently of said inner guides a predetermined vertical distance in advance of the vertical movement of said inner guides.

4. In a truck, the combination with a frame, of a pair of vertical outer guides mounted on said frame, a pair of inner guides telescopically related to said outer guides, a load carrier slidably mounted on said inner guides, telescopically related upper and lower piston-cylinder couples, the piston element of said lower couple being connected at its lower end to the lower ends of said outer guides, the cylinder element of said upper couple being connected at its upper end to one of said inner guides and the piston element of said upper couple being hollow and slidably fitting the cylinder element of said lower couple, a reeving device exteriorly mounted on the upper end portion of the cylinder element of said upper couple, a reeving device exteriorly mounted on the lower end portion of said piston element of said upper couple, a flexible member connected at its outer end to said carrier and to the cylinder element of said upper couple inwardly of its lower end and engaging said devices intermediate its ends, operating connections between the cylinder element of said lower couple and one of said inner guides, and means for supplying fluid under pressure to said couples, said couples having a differential relation effective to move said carrier along said inner guides a predetermined vertical distance in advance of the vertical movement of said inner guides.

5. In a truck, the combination with a frame, of a pair of vertical outer guides mounted on said frame, a pair of inner guides telescopically related to said outer guides, a load carrier slidable on said inner guides, and fluid operated means for raising said load carrier, said means consisting of a piston fixedly related to the lower end of one of said outer guides, a lower cylinder telescopically related to said piston and forming therewith a fluid chamber, an upper cylinder connected to said inner guides and an intermediate cylinder telescopically related to said lower cylinder and said upper cylinder and forming with the latter a fluid chamber, a flexible member connected at its inner end to said carrier and anchored at its outer end to said upper cylinder, reeving elements for said flexible member mounted on said upper cylinder and on the lower end portion of said intermediate cylinder, means actuated by said lower cylinder for moving said inner guides for moving the latter endwise relative to said outer guides and means for supplying liquid under pressure into said upper cylinder and into said lower cylinder.

6. In a truck, the combination with a frame, of a pair of vertical outer guides mounted on said frame, a pair of inner guides telescopically related to said outer guides, a load carrier slidable on said inner guides, and fluid operated means for raising said load carrier, said means consisting of a piston fixedly related to the lower ends of said outer guides, a lower cylinder telescopically related to said piston, the upper end of said lower cylinder having a head normally engaging the upper end of said piston and forming therewith a fluid chamber, an upper cylinder closed at its upper end and connected to one of said inner guides, an intermediate cylinder within said upper cylinder and forming therewith a fluid chamber and arranged to slidably fit the outer wall of said lower cylinder when moved downwardly, said intermediate cylinder being closed by a head at its upper end, a flexible member connected at its inner end to said carrier and anchored at its outer end to said upper cylinder, reeving elements for said flexible member mounted on said upper cylinder and on the lower end portion of said intermediate cylinder, means connecting said lower cylinder to one of said inner guides for moving the latter endwise relative to said outer guides and means for supplying fluid under pressure into said upper cylinder and into said lower cylinder and arranged to initially move said intermediate cylinder downwardly to raise said carrier independently of said guides to a predetermined position and thereafter move said lower and intermediate cylinders upwardly to raise said inner guides relative to said outer guides and said carrier above said predetermined position.

7. In a truck, the combination with a frame, of a pair of vertical outer guides mounted on said frame, a pair of inner guides telescopically related to said outer guides, a load carrier slidably mounted on said inner guides, telescopically related upper and lower piston-cylinder couples, the piston element of said lower couple being connected at its lower end to the lower end of one of said outer guides, the cylinder element of said upper couple being connected at its upper end to the upper end of one of said inner guides and the piston element of said upper couple being hollow and slidably fitting the cylinder element of said lower couple, flexible members disposed at opposite sides of said couples and connected at their inner ends to said carrier and anchored at their opposite ends to the opposite sides of the cylinder of said upper couple, reeving elements for said members diametrically mounted on the outer side of the cylinder of said upper couple, reeving elements for said members diametrically mounted on the outer side of the piston element of said upper couple, operating connections between the cylinder element of said lower couple and said inner guides and means for simultaneously supplying liquid under pressure to said couples, said couples having a differential relation effective to initially move said carrier relative to and independently of said inner guides a predetermined vertical distance in advance of the vertical movement of said inner guides.

8. A truck as claimed in claim 6 wherein the length of said piston is proportioned to the length of said guides to limit the downward movement of said intermediate cylinder and raising of said carrier independently of said guides.

9. In a truck, the combination with a frame, of a pair of vertical outer guides mounted on said frame, a pair of inner guides telescopically related to said outer guides, a load carrier slidably mounted on said inner guides, a piston connected at its lower end to the lower end of one of said outer guides, a cylinder slidably related to said piston and movable upwardly relative thereto, a separate cylinder connected at its upper end to one of said inner guides, a hollow piston in said separate cylinder and movable downwardly relative thereto and arranged to telescopically engage the outer wall of said first mentioned cylinder, operating connections between said carrier, said separate cylinder and said hollow piston, operating connections between said first mentioned cylinder and said inner guides, and means for applying fluid under pressure to each of said cylinders, a valve mechanism for controlling the supply of fluid to said cylinders and arranged to move said hollow piston downwardly to raise said carrier to a predetermined level and to move said first mentioned cylinder and said hollow piston upwardly to raise said carrier to a higher level.

10. In a truck, the combination with a frame, of a pair of vertical outer guides mounted on said frame, a pair of inner guides telescopically related to said outer guides, a load carrier slidably mounted on said inner guides, hydraulically operated means for raising said carrier to a predetermined level independently of the guides and raising said inner guides and said carrier to a higher level, said means including a cylinder connected to one of said inner guides, a piston herein, operating connections between said carrier, cylinder and piston arranged when the latter is moved downwardly to move said carrier upwardly to a predetermined level independently of said guides, a liquid pressure operated device connected to said inner guides for moving said piston in the opposite direction and said inner guides upwardly and through said operating connections raise said carrier to a higher level, and means for supplying liquid under pressure to said cylinder and to said device.

11. In a truck, the combination with a frame, of a pair of vertical outer guides mounted on said frame, a pair of inner guides telescopically related to said outer guides, a load carrier slidable on said inner guides, upper and lower reeving devices, a support for said upper reeving device fixedly related to said inner guides, a separate support for said lower reeving device, slidably mounted in said first mentioned support, a flexible member connected at its inner end to said carrier and anchored at its outer end to said first mentioned support and engaging said devices intermediate its ends, said separate support being movable downwardly to effect a reeving of said flexible member, whereby said carrier is raised to a predetermined level independently of said guides, a movable device having reeving connections with said inner guides and arranged when moved upwardly to move said separate support upwardly and said inner guides and first mentioned support upwardly at a faster rate of speed relative to said separate support, to raise said carrier to a higher level, and means for successively moving said separate support downwardly and said movable device upwardly.

12. In a truck, the combination with a frame, of a pair of outer guides mounted on said frame, a pair of inner guides telescopically related to said outer guides for movement endwise thereof, a load carrier slidable on said inner guides, upper and lower reeving devices, relatively movable supports for said devices, the support for said upper device being connected to said inner guides for movement therewith, a flexible member connected at its inner end to said carrier and anchored at its outer end to the support for said upper device and engaging said devices intermediate its ends, said support for said lower reeving device being movable downwardly to effect a reeving of said flexible member and raise said carrier to a predetermined level independently of said guides, a movable device having reeving connections with said inner guides and arranged when moved upwardly to move said support for said lower reeving device upwardly and simultaneously move said inner guides and said support for said upper reeving device upwardly and relatively to said support for said lower reeving device to effect relative movement between said reeving devices, whereby said carrier is moved to a higher level, and means for successively operating the support for said lower reeving device downwardly and said movable device upwardly.

13. In a truck, the combination with a frame, of a pair of outer guides mounted on said frame, a pair of inner guides telescopically related to said outer guides for movement endwise thereof, a load carrier slidable on said inner guides, upper and lower reeving devices, a cylinder and a piston therein for supporting said devices, respectively, said cylinder being connected to said inner guides for movement therewith, a flexible member connected at its inner end to said carrier and anchored at its outer end to said cylinder and engaging said devices intermediate its ends, said piston being movable downwardly to effect a reeving of said flexible member and raise said carrier to a predetermined level independently of said guides, a movable device having reeving connections with said inner guides and arranged when moved upwardly to move said piston upwardly and simultaneously move said inner guides and said cylinder upwardly and relative to said piston to effect relative movement between said reeving devices, whereby said carrier is moved to a higher level, and means for supplying fluid pressure to said cylinder and said movable device to successively move said piston downwardly and said movable device upwardly.

14. In a truck, the combination with a frame, of a pair of vertical outer guides mounted on the frame, a pair of inner guides telescopically related to said outer guides, a load carrier slidably mounted on said inner guides, upper and lower reeving devices, relatively movable supports for said devices, said upper support being connected to said inner guides, a flexible member connected at its inner end to said carrier and anchored at its outer end to the support for said upper reeving device and engaging said devices intermediate its ends, a movable member having reeving connections with said inner guides for moving them upwardly, and mechanism for moving the support for said lower reeving device downwardly into engagement with said movable member and for moving said movable member upwardly to move the support for said lower reeving device upwardly and through said reeving connections move said inner guides and the support for said upper reeving device upwardly relative to the support for the said lower reeving device, the downward movement of the support for said lower reeving device serving to raise said carrier to a predetermined level and relative upward movement of said supports serving to raise said carrier to a higher level.

15. In a truck having a pair of substantially vertical outer guides supported on the truck frame, a pair of inner guides slidably mounted on said outer guides and movable endwise thereof, a load carrier slidably mounted on said inner guides, a hydraulically operated mechanism consisting of a member mounted on the truck frame between said pairs of guides, a plurality of concentrically related elements axially disposed and movable endwise of said member and formed with fluid connections between them, one of said elements being provided with diametrically disposed reeving devices, flexible members engaging said reeving devices and connected to said load carrier, and fluid under pressure supply means controlled by a single valve and connected to the spaces between said elements and arranged to apply pressure to the upper end of that element provided with said reeving devices and the adjacent element for moving said first element downwardly relative to the adjacent element and into concentric relation to said member to raise said load carrier longitudinally of and independently of said inner guides.

16. A truck as claimed in claim 15 wherein said concentrically related elements, following the movement of said load carrier relative to said inner guides, are relatively moved by the continued supply of fluid pressure to simultaneously raise the inner guides and said load carrier upwardly to position the latter at a higher level.

17. In an industrial truck having a pair of outer vertical guides, a pair of inner vertical guides slidably mounted on said outer guides and movable endwise thereof, an elevating member slidably mounted on said inner guides, a hydraulically operated mechanism consisting of a plurality of axially related and relatively movable concentric cylinder-piston elements one of which is provided with diametrically related reeving devices, flexible members engaging said reeving devices and connected to said elevating member, a second element being mounted on the truck frame and a third element being connected to said inner guides, a supply of fluid under pressure having a controlling valve for said mechanism arranged to first move that element provided with said reeving devices endwise to raise said elevating member longitudinally and independently of said inner guides to a predetermined level and thereafter operate said third member relative to said second member to raise said inner guides and said elevating member, whereby the latter is raised to a higher level.

18. In a truck having a pair of substantially vertical main guides supported on the truck frame, a pair of secondary guides slidably mounted on the main guides for movement endwise thereof, a load carrier slidably mounted on said secondary guides, a hydraulically operated mechanism for raising said carrier and consisting of an elongated member mounted on the truck frame between and parallel to said guides, a plurality of concentrically related relatively movable elements disposed axially of said member, one of said elements being provided with diametrically disposed outwardly extending shafts, reeving devices mounted on said shafts, flexible members engaging said reeving devices and connected to said carrier, and valve controlled fluid pressure supply means connected to said mechanism and arranged to initially apply pressure to that element of said mechanism provided with said reeving devices to move said element axially of said elongated member and raise said carrier relative to said guides and thereafter move said carrier and said secondary guides relative to said main guides.

19. In an industrial truck having a pair of outer vertical guides, a pair of inner vertical guides slidably mounted on said outer guides and movable endwise thereof, an elevating member slidably mounted on said inner guides, a hydraulically operated mechanism consisting of a plurality of axially related and relatively movable concentric cylinder-piston elements, one of which is provided with diametrically related reeving devices, flexible members engaging said reeving devices and connected to said elevating member, a second element being mounted on the truck frame and a third element having at its upper end an end wall, to which fluid pressure is applied, connected to said inner guides, a supply of fluid under pressure having a controlling valve for said mechanism arranged to first move that element provided with said receiving devices endwise to raise said elevating member longitudinally and independently of said inner guides to a predetermined level and thereafter, due to fluid pressure on said end wall, operate said third member relative to said second member to raise said inner guides and said elevating member, whereby the latter is raised to a higher level.

NATHAN M. LAWLESS.

REFERENCES CITED

The following references are of record in the file of this patent:

UNITED STATES PATENTS

| Number | Name | Date |
| --- | --- | --- |
| 2,505,009 | Schroeder | Apr. 12, 1950 |